(No Model.)  W. SWINDELL.  2 Sheets—Sheet 2.
FURNACE.

No. 504,118.  Patented Aug. 29, 1893.

WITNESSES:
Dannis S. Wolcott
F. E. Gaither

INVENTOR,
William Swindell
by George H. Christy
Att'y.

UNITED STATES PATENT OFFICE.

WILLIAM SWINDELL, OF ALLEGHENY, PENNSYLVANIA.

FURNACE.

SPECIFICATION forming part of Letters Patent No. 504,118, dated August 29, 1893.

Application filed March 31, 1893. Serial No. 468,517. (No model.)

*To all whom it may concern:*

Be it known that I, WILLIAM SWINDELL, a citizen of the United States, residing at Allegheny, in the county of Allegheny and State of Pennsylvania, have invented or discovered certain new and useful Improvements in Furnaces, of which improvements the following is a specification.

The invention described herein relates to certain improvements in regenerative furnaces, and has for its object such a construction and arrangement of the regenerating chambers and their flues as will permit of the cleaning of the chambers and flues without interference with the continuous operation of the furnace.

The invention is hereinafter more fully described and particularly claimed.

Figure 1:
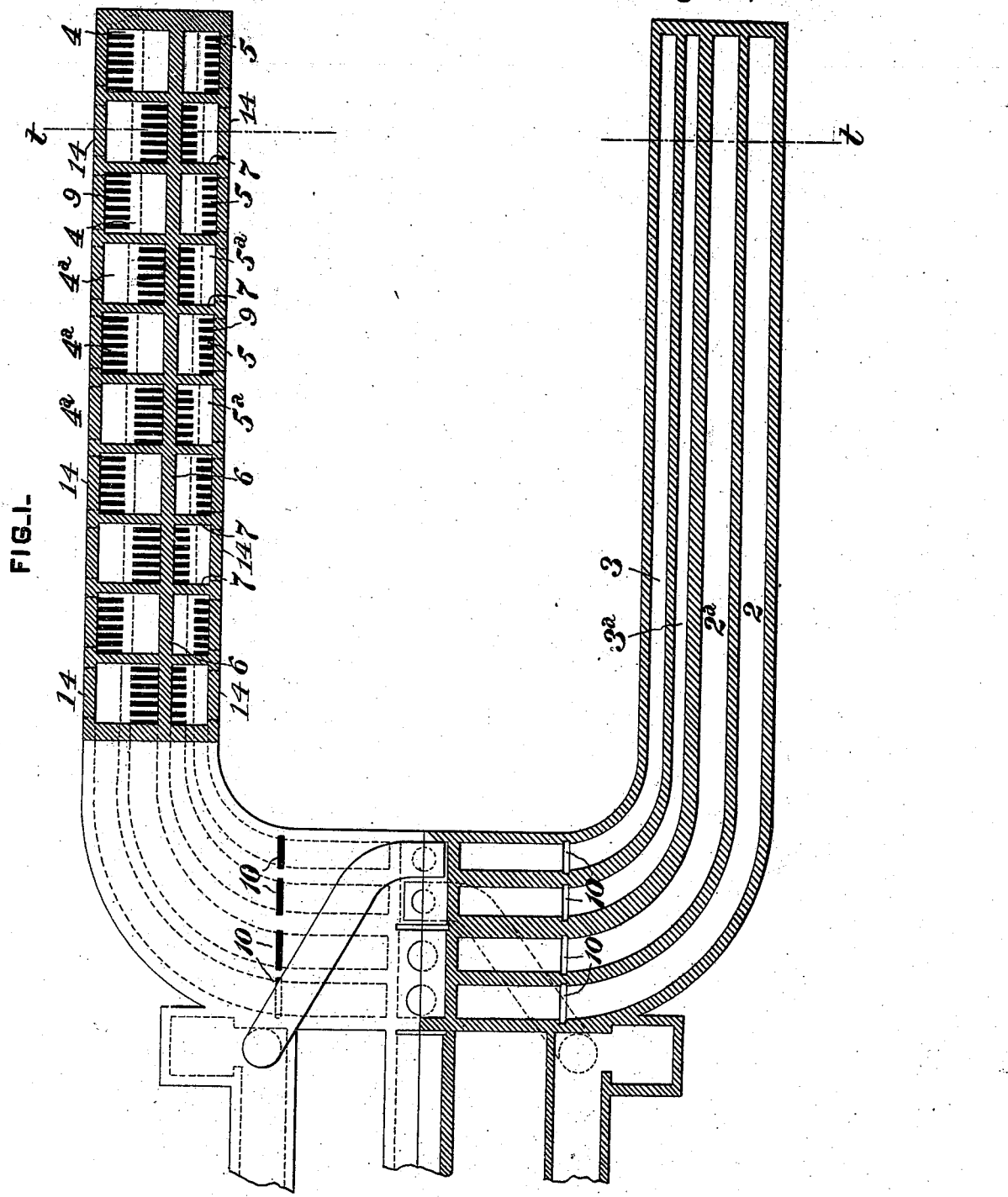
Figure 2:
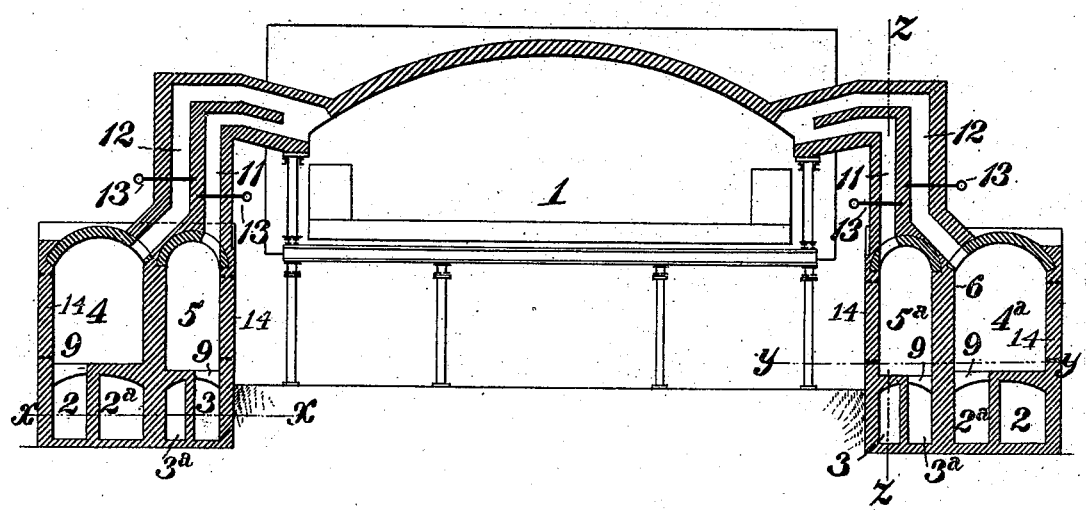
Figure 3:
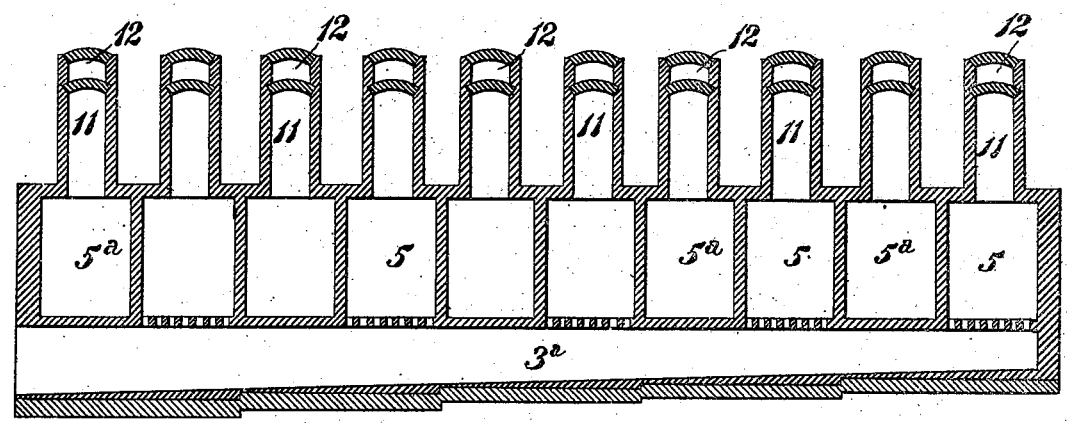

In the accompanying drawings forming a part of this specification, Figure 1 is a horizontal section taken through the flues on one side of a tank furnace and the regenerating chambers on the opposite side, as indicated by the lines $x$, $x$, and $y$, $y$, Fig. 2. Fig. 2 is a vertical section, the plane of section being indicated by the line $t$, $t$, Fig. 1; and Fig. 3 is a vertical section, the plane of section being indicated by the line $z$, $z$, Fig. 2.

In the application of my invention to tank furnaces, the tank or melting chamber 1 is constructed in the usual or any suitable manner, and on each side of the chamber are arranged two air flues 2, $2^a$, and two gas flues 3, $3^a$. The regenerating chambers 4, $4^a$, and 5, $5^a$, are built on top of the flues, being formed by a longitudinal wall 6, separating the gas from the air regenerating chambers, and by a series of transverse partitions 7, which do not extend below the tops of the flues. As shown in Figs. 1 and 2, each of the gas chambers extends over both gas flues and similarly each air chamber extends over both air flues, but only every other one of the regenerating chambers is connected to the same flues, as for example the air chambers 4 are connected to the air flues 2, and the chambers $4^a$ to the flues $2^a$. Similarly the gas chambers 5 are connected to the flues 3, and the chambers $5^a$ to the flues $3^a$. This alternate connection of the regenerating chambers with the flues is effected by forming the portion of the bottom of each chamber, extending over one of the flues, solid or imperforate as indicated at 8, in Figs. 1 and 2, and the remaining portion of the bottom covering the other flue, open or perforated as shown at 9, in the same figures. Each of the gas flues has an independent valved connection with the producers or other suitable source of supply and both gas and air flues are provided with valves 10, whereby the flow of gas and the products of combustion through the flue may be regulated. The gas and air chambers are connected by flues 11 and 12 with the heating or melting chamber and are provided with valves 13 for closing the same, as shown in Fig. 2. If at any time during the operation of the furnace, the regenerating chambers become clogged, the flues 2 and 3 are cut off from communication with the gas producers and the stack, openings 14 indicated in dotted lines are then formed in the outer walls of the chambers 4 and 5, the checker work and dirt removed therefrom, the checker work restored and the openings closed. As soon as one set of chambers has been cleaned, they are put into operation and the flues for the other set of chambers closed, and the latter cleaned and renewed in the manner described.

The regenerating chambers and the flues are made of such a size that when one-half thereof is cut out in the manner described, sufficient heat may be maintained in the heating or melting chamber for the ordinary operation thereof.

I claim herein as my invention—

In a regenerative furnace the combination of a heating or melting chamber, a series of independent gas regenerating chambers on each side of the heating or melting chamber, a like series of independent air regenerating chambers on each side of the heating or melting chamber, the regenerating chambers having suitable flue connections with the melting chamber, a pair of gas flues and a pair of air flues on each side of the melting chamber, a portion of the gas regenerating chambers on each side of the melting chamber being connected with one of the gas flues and the remainder with the other gas flue, and the air regenerating chambers having a like alternating connection with the air flues, substantially as set forth.

In testimony whereof I have hereunto set my hand.

WILLIAM SWINDELL.

Witnesses:
R. H. WHITTLESEY,
DARWIN S. WOLCOTT.